(No Model.)    2 Sheets—Sheet 1.

W. H. TORSTRICK.
SHAFT BEARING.

No. 541,902.    Patented July 2, 1895.

Witnesses:    Inventor.
Wm. C. Dashiell    Wm. H. Torstrick
    By Edson Bros.,
    Attorneys.

(No Model.) 2 Sheets—Sheet 2.
W. H. TORSTRICK.
SHAFT BEARING.
No. 541,902. Patented July 2, 1895.
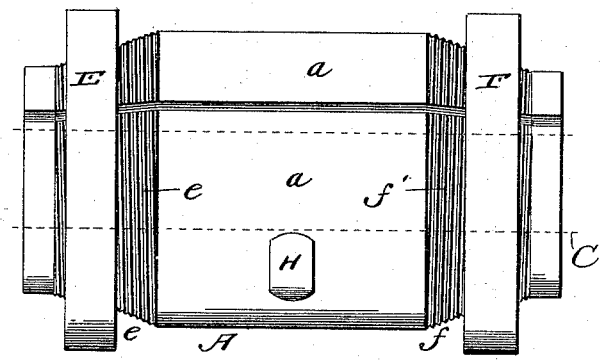
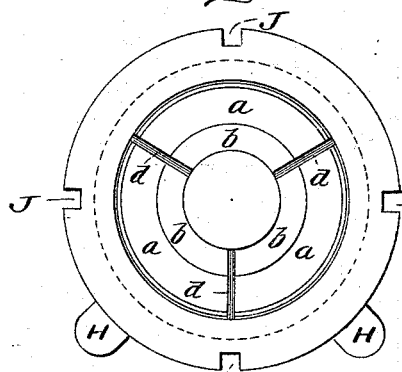
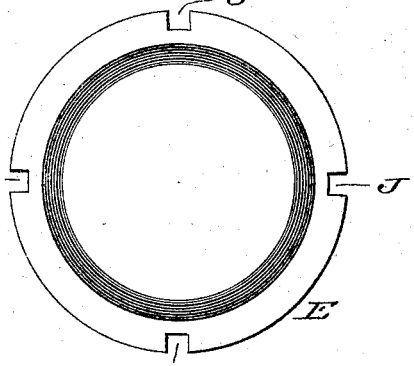
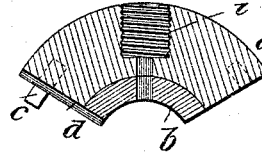
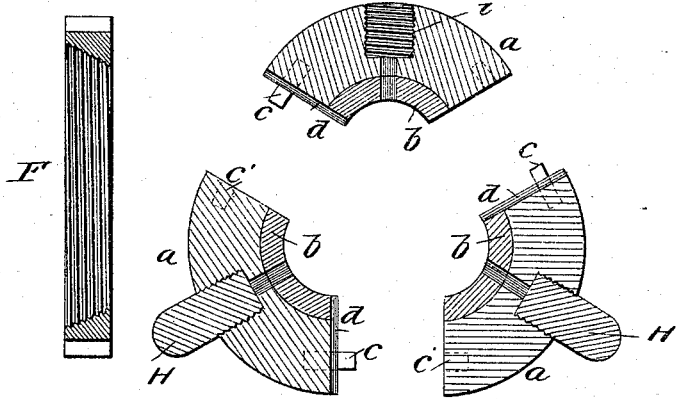
Witnesses: Inventor.
Wm. H. Torstrick
By Edson Bro's
Attorneys

UNITED STATES PATENT OFFICE.

WILLIAM HENRY TORSTRICK, OF OYSTER BAY, NEW YORK.

SHAFT-BEARING.

SPECIFICATION forming part of Letters Patent No. 541,902, dated July 2, 1895.

Application filed August 2, 1894. Serial No. 519,289. (No model.)

*To all whom it may concern:*

Be it known that I, WILLIAM HENRY TORSTRICK, a citizen of the United States, residing at Oyster Bay, in the county of Queens and State of New York, have invented certain new and useful Improvements in Shaft-Bearings; and I do hereby declare the following to be a full, clear, and exact description of the invention, such as will enable others skilled in the art to which it appertains to make and use the same.

My invention is an improvement in shaft or journal bearings more particularly designed for use in dynamo electric machines or motors where high speed is required, although the bearing is equally useful in, and applicable to, other kinds of machinery or engines.

The object of this invention is to provide a simple shaft bearing which can be accurately adjusted to conform to the true geometrical center of the shaft for the purpose of compensating for the natural wear on the surfaces of the shaft and bearing which are in contact, and to cause the shaft to run smoothly and easily without having lateral play or what is known as a "wabbling" motion; and a further object that I have in view is to provide for the adjustment of the bearing to bring new surfaces thereof in contact with the revolving shaft at the place where the greatest friction and wear occurs on the parts.

To enable others to understand my invention I have illustrated the preferred embodiment thereof in the accompanying drawings, forming a part of this specification, and in which—

Figure 1:
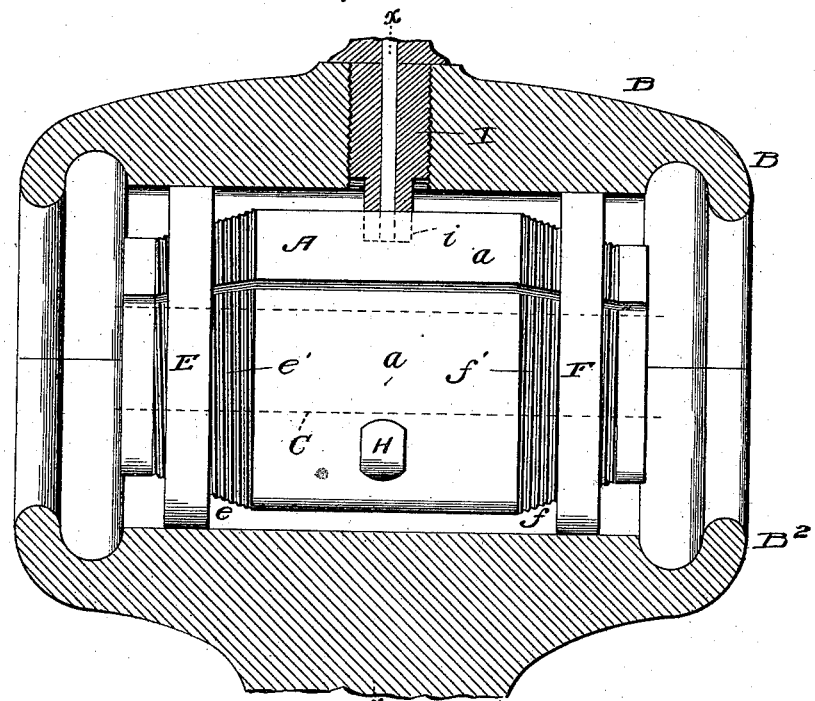
Figure 2:
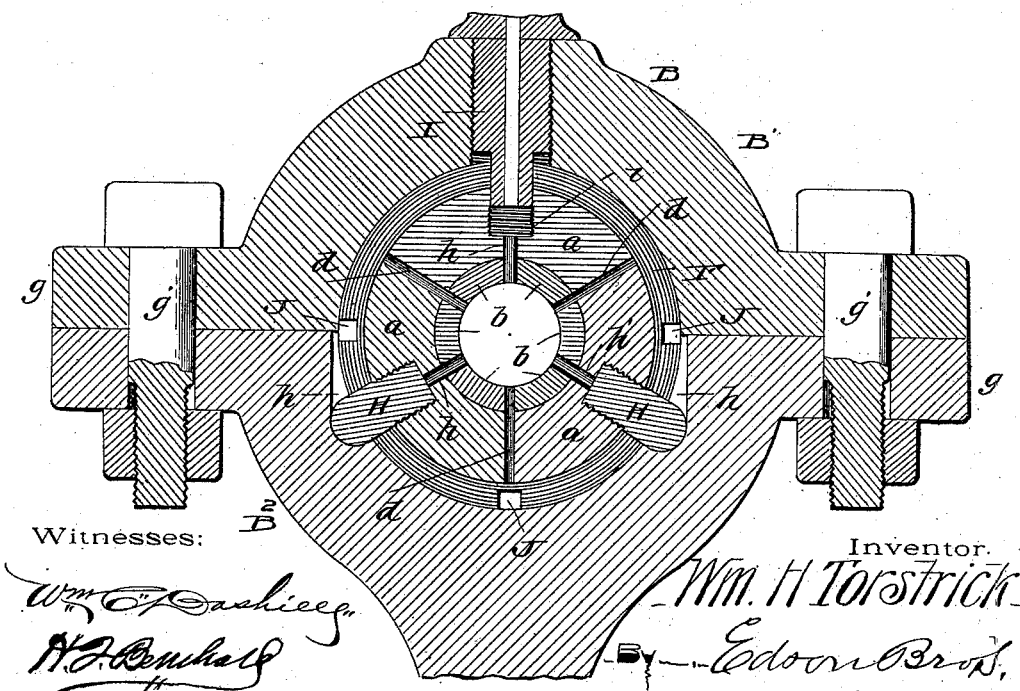

Figure 1 is a view showing the external box or casing in longitudinal sectional and the bearing in side elevation. Fig. 2 is a vertical transverse sectional view on the plane indicated by the dotted line $x-x$ of Fig. 1. Fig. 3 is a side elevation, and Fig. 4 an end elevation, of the shaft bearing detached from the box or casing. Figs. 5 and 6 are respectively a detail side elevation and cross sectional view of one of the adjusting rings or collars. Fig. 7 is a detail cross sectional view through the shaft bearing illustrating the segments thereof separated and in position to be assembled together to complete the bearing. Fig. 8 is a detail view of a wrench that may be employed to adjust the collar or ring to the shaft bearing.

Like letters of reference denote corresponding parts in all the figures of the drawings, referring to which—

A designates the shaft bearing. B is the box or casing in which it is suspended and housed, and C is the shaft indicated by dotted lines.

The bearing A is divided throughout its length on radial lines to the axis thereof to produce a series of segments $a, a, a$, preferably three in number, although this is not material, and equal in size so each presents the same internal area or surface to the shaft C. These segments $a, a, a$, of the bearing are lined on their inner surfaces which come in contact with the shaft with an anti friction material, such as "Babbitt" metal or other suitable substance, as indicated at $b$ in Figs. 2 and 4 of the drawings, and said segments $a, a, a$, are interlocked together in a manner to admit of their compression upon or adjustment toward the shaft by means of the dowel pins $c$ fitting in the holes or sockets $c'$, each segment having a pin $c$ at one edge and a hole $c'$ at its other edge which respectively fit into a hole $c'$ on one segment $a$ and receive the pin $c$ on the third segment. Between the abutting or opposing faces of the segments $a, a, a$, are interposed the packings $d, d, d$, which may be made of any preferable material and which are designed to be compressed between the segments so as to form tight joints longitudinally along the bearing A where the segments meet one another, thus preventing to a certain extent the leakage and waste of the lubricant between the joints of the segments forming the bearing.

The internal diameter of the bearing A is practically uniform throughout the length thereof, but the external diameter of the bearing is not the same toward its ends as at the middle portion thereof. Near its ends, the bearing A has the inclines or bevels $e, f$, one of which surfaces $e$ is tapered from the cylindrical surface of the bearing toward its right hand end and the other bevel $f$ is tapered toward the left hand of the bearing. The tapered or beveled surface $e$ is cut or formed with a right hand screw thread, indicated at $e'$, the diameter of the threads increasing from the end of the bearing toward the middle portion thereof, thus producing the external bevel screw threads at the right hand end of the bearing. The other tapered or beveled surface $f$ is likewise formed with a screw thread $f'$ the threads of which increase in diameter from the end of the bearing toward the middle thereof to produce the tapered or bevel threaded surface at the left hand of the bearing; but this thread $f'$ is cut or inclined in a reverse direction to the threads $e'$ at the other end of the bearing, whereby there is produced upon the cylindrical surface of the bearing the right and left hand bevel screw threads $e', f'$ near the respective ends of the bearing.

E, F, designate the adjusting rings or collars which are constructed and fitted to the bearing to compress or force the same upon the shaft uniformly and simultaneously, the one E being adapted to the beveled thread $e'$ and the other F to the other thread $f'$. These collars or rings are of the same external diameter to enable them to fit properly and snugly in the inclosing box or casing B, but the inside of the collar E is cut with a beveled or tapered right hand screw thread to adapt it to be screwed upon the threaded surface $e'$, while the other collar F has its inside surface with a beveled or tapered left hand screw thread to accommodate the collar F to the threaded surface $f'$ of the bearing A.

By turning the collars E, F, on the threaded portions of the bearing so that they will approach each other or move toward the larger portions of the beveled surfaces $e, f$, the segments $a, a, a$, of the bearing will be uniformly and simultaneously compressed toward the geometrical center of the shaft, and thus the bearing segments can be kept true in relation to the surface of the shaft, whereby the wear upon the shaft and bearing can be compensated for by the adjustment of the segments $a, a, a$, and the shaft will run smoothly and easily in the bearing without any liability to lateral play or movement.

The box or casing B is divided on a horizontal line into upper and lower sections B', B², which are provided with perforated flanges or lugs, $g$, through which are fitted the nutted and headed bolts, $g'$, that tightly secure the box members together.

The lower member B² of the box or casing has the grooves or seats $h, h$, on the inner semi-cylindrical surface thereof and near the upper edge, and in these seats $h, h$, are fitted the stay pins or bolts H, H, that suspend the bearing A in the box or casing B. These stay bolts or pins H are threaded and screwed into threaded sockets $h'$ formed radially in the segments $a, a, a$, forming the lower portion of the bearing A, to adapt the pins or bolts to be adjusted outward and properly take into the seats $h$ when the segments $a, a, a$, are compressed. These pins or bolts H being adjusted in respect to the bearing A, they adjust the bearing to bear equally in all directions, the outer ends of the stay pins or bolts being rounded to fit in the correspondingly shaped ends of the seats $h$.

The top segment $a$ of the bearing is provided with a vertical opening, $i$, which serves as an oil cup to supply the lubricant to the shaft bearing, and in this opening is fitted the lower end of the threaded hollow stem of a vertical bushing, I, shown by Fig. 2, said bushing being secured in the upper member B' of the sectional box or casing, said bushing I serving as the conduit for the supply of the lubricant from the lubricator (not shown) on the top of the box B, to the oil cup $i$ in the bearing A.

To provide for the convenient adjustment of the collars or rings E, F, they have notches, J, cut at suitable intervals on the external surface thereof. A wrench of the form shown in Fig. 8 is adapted to span the collar or ring, and its nib or lug is fitted in the notch, so that the ring or collar can be turned when pressure is applied to the wrench.

I am aware that changes and alterations in the form and proportion of parts and in the details of construction of the devices herein shown and described as an embodiment of my invention can be made without departing from the spirit of sacrificing the advantages of my invention.

Having thus fully described my invention, what I claim as new, and desire to secure by Letters Patent, is—

1. The combination with an inclosing box or casing, of a sectional bearing fitted therein and provided with means for adjusting its segments radially with respect to the shaft, and adjustable devices which engage with said shaft bearing and with the box or casing to adjustably suspend the shaft bearing within the casing, substantially as and for the purposes described.

2. The combination of an inclosing box or casing having the seats, $h$, on its inner surface, the sectional bearing fitted in the box and provided with means for compressing its members, and adjustable stay bolts or pins connected to the bearing and fitted in the seats of said box, substantially as and for the purposes described.

3. A shaft bearing divided longitudinally on lines radial to the axis thereof and having its segments connected together by interlocking devices which admit of radial adjustment of the segments, combined with packings interposed between the abutting faces of the segments, and means for adjusting the segments toward the shaft, and compressing the packings between the abutting faces of said segments substantially as and for the purposes described.

In testimony whereof I affix my signature in presence of two witnesses.

WILLIAM HENRY TORSTRICK.

Witnesses:
 WM. M. NATHAN,
 FRED. J. RICHTENS.